Figure 4:
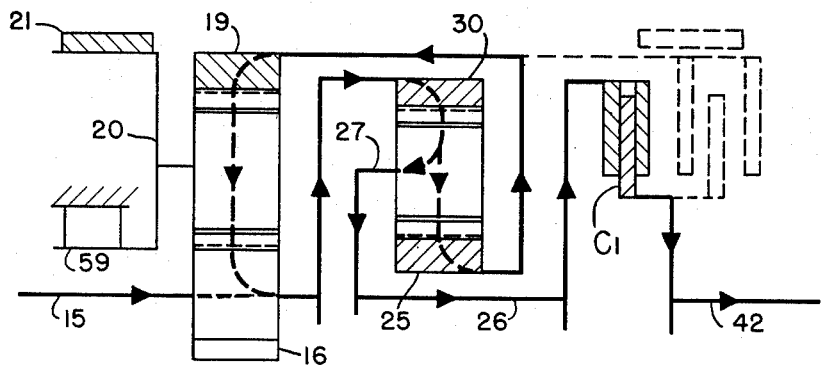

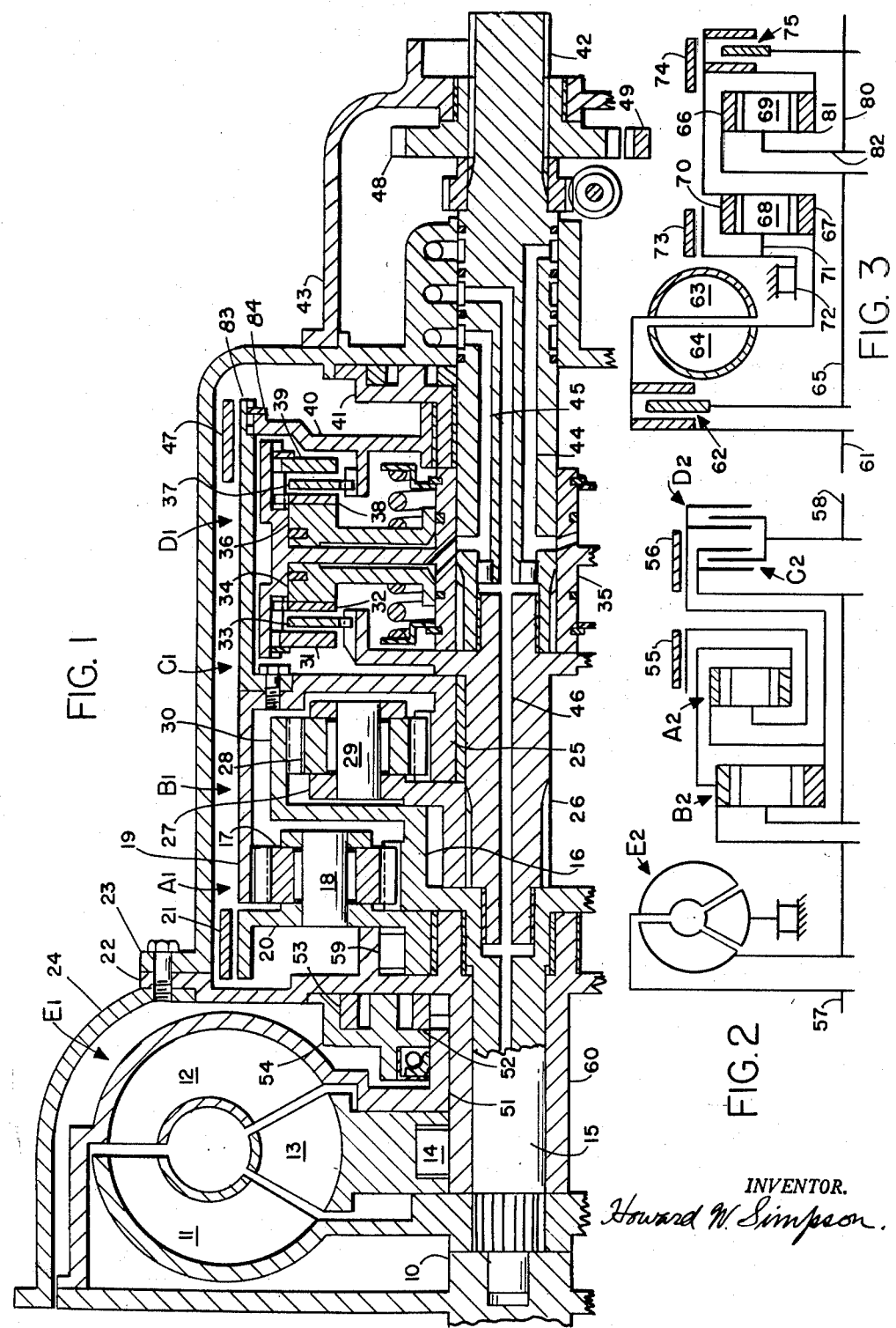

United States Patent Office 2,865,231
Patented Dec. 23, 1958

2,865,231

PLANETARY TRANSMISSION

Howard W. Simpson, Dearborn, Mich.

Application October 1, 1956, Serial No. 613,199

27 Claims. (Cl. 74—759)

This invention refers to a power transmission having three forward speeds and one in reverse. It is a novel combination of a hydrodynamic coupling, driving, driven and supporting members, planetary gearing, two friction plate type clutches, two reaction members and brakes for holding them, and hydraulic control elements combined to operate the mechanism.

The gearing consists of two simple planetary gear sets, each with sun, ring and planet gears all in the same radial plane and with each planet gear meshing with both the sun and ring gear of its own gear set.

The two gear sets are coupled in differential relationship in low gear. A reduction through one gear set only produces a second speed and a reduction through the other gear set produces reverse. A third forward speed is obtained when both gear sets are locked up in direct drive by engaging both clutches.

In one embodiment shown, the hydrodynamic coupling is a three element torque converter while in another embodiment, a two element fluid coupling is used and is arranged in such a way as to be effective in low and reverse speeds only, while in second and third speed, the entire torque by-passes the fluid coupling. An object is therefore to improve fuel economy in the most commonly used speed ratios, i. e. second and third speeds.

A fortunate characteristic of this gear train is that the reaction member for low speed is also the reaction member for reverse. A one-way brake, biased to prevent backward rotation, can thus be used between this reaction member and the transmission housing because the reaction member never rotates backward in any speed or in neutral.

This provides automatic self-timing of the shift from low to second speed and vice versa without interruption of power and without either an overlap of speeds or run away which would otherwise occur with a momentary neutral no drive condition.

Another object of this invention is therefore to provide smooth speed changing and continuous power flow during speed changes.

Another object is to provide simple gearing in which closely stepped ratios can be obtained. For instance, if the sun gears are each half as large as their corresponding ring gears, the gear ratios are 2.0, 1.5 and 1.0 to 1 for low, second and third speeds, and the reverse ratio is 2.0 to 1.

The two friction clutches are used to couple various gear members to the output shaft instead of the more common practice of coupling them to the input shaft. This can be done without requiring clutches of large capacity because the ratios produced are never large with this particular gear train.

The advantage of this clutch location is that the clutch plate differential speeds are small when the clutches are released.

An object is therefore to provide a transmission in which clutch drag losses are low.

Another object is to provide a simple clutch structure in which two clutches are mounted in a single housing.

Another object is to provide stationary hubs for supporting the two brake drums to prevent the imposition of radial loads from brake bands on rotating shafts which would cause heat, wear and power loss.

Another object is to provide a transmission in which the gearing is driven in all forward speeds by the same clutch.

Another object is to locate one brake band and drum at each end of the transmission case to eliminate the need of an additional stationary bulkhead at a mid-point to support the brake drums.

Another important object is to provide the simplest, most efficient and quiet type of gearing possible in the reduction which is ordinarily most used in a road vehicle, i. e. second speed of a three speed unit.

It is well known that a simple planetary gear set with ring gear input and carrier output meets this condition best and this is used for second speed.

In the drawings Fig. 1 is a partial elevation in section of the embodiment with a fluid torque converter. Fig. 2 is a diagrammatic partial elevation in section also with a torque converter but with the position of the two gear sets interchanged.

Fig. 3 is a diagrammatic partial elevation in section similar to Fig. 1 but with a two element fluid coupling instead of a three element fluid torque converter. Also one of the clutches is located at the input instead of at the output end of the transmission. Figs. 4 to 7 are diagrammatic partial elevations in section of the embodiment of Fig. 1, in low, second, third and reverse speeds respectively. Hydraulic servo mechanisms for engaging the brakes and clutches are not shown as these are well known to those skilled in the art.

In Fig. 1 engine shaft 10 drives pump 12 of converter E1 in housing 24. Turbine 11 is splined to input shaft 15 and stator 13 is free to turn forward on the hub of plate 22 but is held against backward rotation by one-way brake 14 at low engine speeds. Hub 51 drives pump gear 52 which meshes with pump gear 53 in housing 54.

Input shaft 15, journaled in the hub of plate 22 attached to housing 23, has sun gear 16 and ring gear 30 integral. Gear set A1 comprises sun gear 16, ring gear 19 and planet gears one of which, 17, is shown on pin 18 fixed in carrier 20. Carrier 20 can be held by brake band 21 and is rotatably supported on plate 22. One-way brake 59 is located between carrier 20 and plate 22 and is biased to prevent backward rotation of carrier 20.

Ring gear 19 is integral with sun gear 25. Brake drum 83 is attached to ring gear 19 and has clutch drum 40 splined to it and held by snap ring 84. Clutch drum 40 is rotatably supported on pump housing 41. Gear set B1 comprises sun gear 25, ring gear 30, and planet gears one of which, 28, is shown on pin 29 fixed in carrier 27 which is splined to intermediate shaft 26, which in turn is splined to clutch plate 33.

Clutch C1 comprises sliding clutch plates 32 and 33, pressure plate 31 attached to housing 35, and piston 34 which forces clutch plates 32 and 33 against pressure plate 31 when oil under pressure enters passage 45.

Clutch D1 comprises sliding clutch plates 37 and 38, pressure plate 39 attached to housing 35, and piston 36 which forces clutch plates 37 and 38 against pressure plate 39 when oil under pressure reaches piston 36 through passage 44. Brake band 47 is engaged to hold sun gear 25 as a reaction member.

Clutch housing 35 and parking gear 48 are splined to output shaft 42 and detent 49 can be engaged to hold output shaft 42 stationary. Housing 43 is attached to housing 23 and supports parking gear 48 and output shaft 42.

In Fig. 2 converter E2, clutches C2 and D2, and brake bands 55 and 56 correspond to converter E1, clutches C1 and D1, and brake bands 21 and 47 in Fig. 1.

Gear sets A2 and B2 are the same as gear sets A1 and B1 in Fig. 1 but have their positions interchanged. Input and output shafts are 57 and 58 respectively.

In Fig. 3 clutch 62 connects engine shaft 61 to ring gear 66 and sun gear 67 is driven from engine shaft 61 through fluid coupling pump 63 and turbine 64.

Planet gear 68 meshes with sun gear 67 and ring gear 70. Carrier 71 is held from turning backward by one-way brake 72. Planet gear 69 meshes with sun gear 81 and ring gear 66, and carrier 82 is connected to output shaft 80.

Clutch 75 locks up sun gear 81, carrier 82 and ring gear 66. Brake band 74, when applied, holds sun gear 81 and ring gear 70. Clutch 62 is engaged in low, second and third speeds. In low one-way brake 72 holds carrier 71. Sun gear 67 and ring gear 66 are simultaneously driven by turbine 64 and clutch 62 respectively. This results in a low speed drive by means of differential action of the gearing with partial input through turbine 64. Brake band 73 is applied to prevent free wheeling.

In second speed brake band 73 is released and brake band 74 is engaged. Gears 67, 68 and 70 then turn idly and the entire input is through clutch 62 with turbine 64 idling. Ring gear 66 drives carrier 82 and output shaft 80 at reduced speed.

In third speed clutches 62 and 75 engage and lock the gears in direct drive. In reverse speed brake band 73 holds carrier 71, and turbine 64 drives sun gear 67. The reverse speed of ring gear 70 is transmitted to output shaft 80 by clutch 75.

In Fig. 4, low speed, input shaft 15 drives ring gear 30 and carrier 20 is held by one-way brake 59. Brake band 21 optionally holds carrier 20 to prevent overrun of carrier 20 to prevent the vehicle from free-wheeling. Sun gear 25 turns backward and is geared to sun gear 16 in such a way that torque feeds back to ring gear 30 as indicated by the arrows. This results in greater torque output at carrier 27 than would occur if sun gear 25 were held stationary. Clutch C1 is shown engaged and transmits this torque to output shaft 42.

Figure 5:
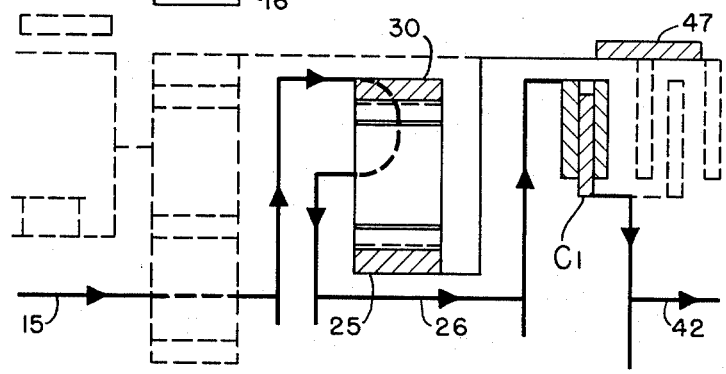

In Fig. 5, second speed, sun gear 25 is held by brake band 47 and the output torque transmitted by clutch C1 is then less than in low speed. The gears shown in dotted lines idle slowly. Second speed is engaged with maximum smoothness and without interruption of power because one-way brake 59 releases carrier 20 automatically when brake band 47 engages.

Figure 6:
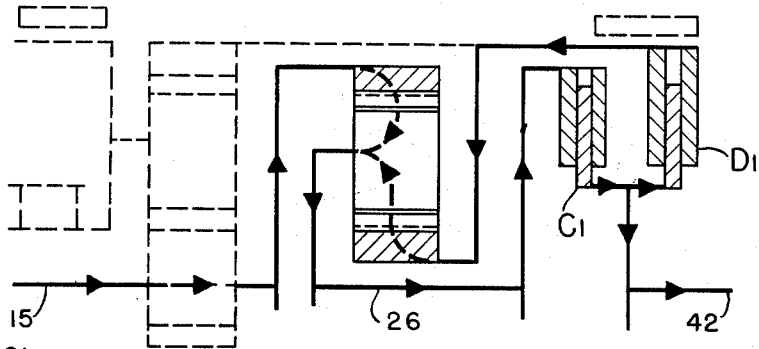

In Fig. 6 clutches C1 and D1 are both engaged thus locking the gears in direct drive. Neglecting friction, the torque at output shaft 42 equals that at input shaft 15 but feed back through clutch D1 results in clutch C1 being subjected to the same torque as in second speed as indicated by arrowed torque paths.

Figure 7:
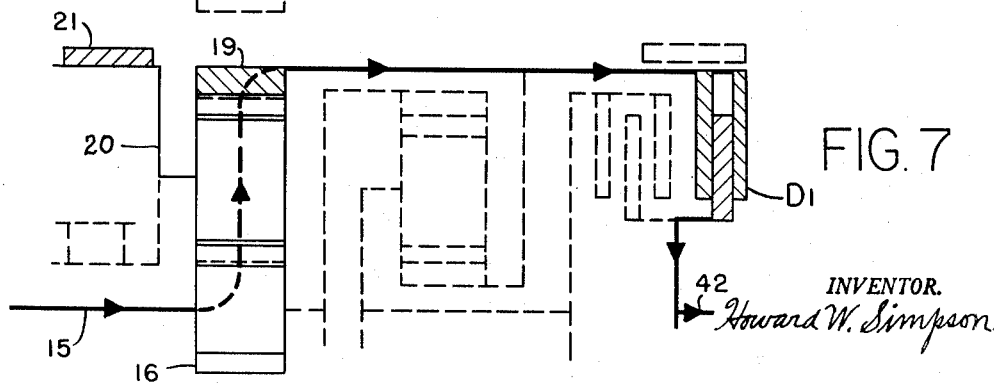

In Fig. 7 brake band 21 holds carrier 20 which causes sun gear 16 to turn ring gear 19 backward and clutch D1 engages to transmit this multiplied reverse torque to output shaft 42.

Having described and illustrated several embodiments of my invention, I wish it understood that my invention is not to be limited to the specific forms or arrangement of parts herein described and shown or specifically covered by the following claims.

I claim:

1. In a power transmission comprising a housing, power input and output means, two sets of planetary gearing, each set comprising a sun gear, a ring gear and a carrier having planet gears meshing with the sun and ring gear only, a first member of each gear set being drivingly connected to the power input means, second members of each gear set being drivingly connected together, a third member of one gear set drivingly connected to the output means and a brake for holding a third member of the other gear set to obtain a reduction drive through the transmission; and selectively engageable means for coupling said second members to the output means to obtain a one to one direct drive between the input and output means when said brake is released and said selectively engageable means is engaged.

2. In a power transmission having input, output and housing members, first and second planetary gear sets each set comprising a sun gear, a ring gear and a carrier having planet gears each meshing with both the sun gear and ring gear, a driving connection between the input member, the sun gear of the first gear set and the ring gear of the second gear set; a driving connection between the carrier of the second gear set and the output member, the ring gear of the first gear set and the sun gear of the second gear set being drivingly connected, and a brake for holding the carrier of the first gear set, to obtain a reduction drive between the input and output members; and a clutch for connecting said first set ring gear and second set sun gear to the output member for obtaining a one to one direct drive between the input and output members when the said brake is released and the said clutch is engaged.

3. The combination set forth in claim 2, and a one-way brake between the carrier of the first gear set and the housing and biased to prevent backward rotation of the said carrier of the first gear set.

4. The combination set forth in claim 2, and a second brake for holding said first set ring gear and second set sun gear to obtain a second reduction drive between the input and output members when the said second brake is engaged and the first mentioned brake is released.

5. In a power transmission, input, output and housing members, first and second planetary gear sets each set comprising a sun gear, a ring gear, and a carrier having planet gears each meshing with both the sun gear and ring gear, a driving connection between the input member, the sun gear of the first gear set and the ring gear of the second set; a driving connection between the carrier of the second gear set to the output member, the ring gear of the first gear set and the sun gear of the second gear set being drivingly connected, and a brake for holding the carrier of the first gear set, to obtain a reduction drive between the input and output members; and a clutch for connecting said first set ring gear and second set sun gear to the output member for obtaining a one to one direct drive between the input and output members when the said brake is released and said clutch is engaged.

6. The combination set forth in claim 5, and a one way brake between the carrier of the first gear set and the housing said one way brake being biased to prevent backward rotation of said carrier of the first gear set.

7. The combination set forth in claim 5, and a second brake for holding said first set ring gear and second set sun gear to obtain a second reduction drive between the input and output members when said clutch and second brake are applied and the first mentioned brake is released.

8. In a power transmission, input, output and housing members, planetary gearing comprising sun, ring and planet gears, said planet gears being rotatably mounted in a rotatable carrier and meshing only with said sun and ring gears, a driving connection between the input member, a first sun, and a second ring gear; a first ring gear and second sun gear being drivingly connected, a driving connection between a second carrier and the output shaft and a brake for holding a first carrier as a reaction member to obtain a reduction drive between the input and output members; and a clutch for connecting said first ring gear and second sun gear to the output member for obtaining a one to one direct drive between the input and output members when the said brake is released and the clutch is engaged.

9. The combination set forth in claim 8, and a one way brake between the first carrier and said housing member, said one way brake being biased to prevent backward rotation of said first carrier.

10. The combination set forth in claim 8, and a second brake for holding said first ring gear and second sun gear to obtain a second reduction drive between the input and output members when said second brake is applied and the first mentioned brake is released.

11. In a power transmission, input and output members and a housing, first and second planetary gear sets, each set comprising sun and ring gears and a rotatable carrier having planet gears meshing with both the said sun gear and ring gear, a driving connection between the input member, the sun gear of the first set and the ring gear of the second set; the ring gear of the first gear set and the sun gear of the second set being interconnected, a first clutch for coupling the carrier of the second gear set to the output member, a second clutch for coupling said interconnected first ring gear and second sun gear to the output member, a first brake for holding the carrier of the first gear set, a second brake for holding the said interconnected first ring gear and second sun gear, and a one way brake biased to hold the carrier of the first gear set against backward rotation.

12. In a power transmission, input and output shafts and a housing, first and second axially aligned planetary gear sets, each set comprising a sun gear, a ring gear and a rotatable carrier supporting at least one planet gear which meshes with both the sun gear and ring gear, a driving connection between the input shaft and the sun gear of the first gear set and the ring gear of the second gear set; a pair of brakes for selectively holding a member of each gear set as a reaction member, a pair of clutches for selectively coupling a member of each gear set to the output shaft, and a driving connection between the ring gear of the first gear set and the sun gear of the second set.

13. The combination set forth in claim 12 and a one way brake adapted to limit the rotation of the carrier of the first gear set to the direction of rotation of the input member.

14. In a power transmission, a housing, input and output shafts, a reduction gear drive comprising a sun gear drivingly connected to the input shaft, a rotatable carrier supporting planet gears meshing with said sun gear and means for holding said carrier against rotation, a ring gear meshing with said planet gears and drivingly connected to a second sun gear, a second rotatable carrier having planet gears meshing with said second sun gear and means for coupling said second carrier to the output shaft, and a ring gear drivingly connected to the input shaft and meshing with the planet gears of the said second carrier.

15. In a power transmission, a housing, input and output shafts, step gearing comprising a sun gear driven by the input shaft, a rotatable carrier supporting planet gears meshing with said sun gear and means for holding said carrier against rotation, a ring gear meshing with said planet gears and drivingly connected to a second sun gear, a second rotatable carrier having planet gears meshing with said second sun gear and means for coupling said second carrier to the output shaft, a ring gear drivingly connected to the input shaft and meshing with the planet gears of said second carrier, selectively engageable means for holding said second sun gear against rotation and means for coupling said second sun gear to the output shaft.

16. In a power transmission, a housing, input and output shafts, step gearing comprising a sun gear driven by the input shaft, a rotatable carrier supporting planet gears meshing with said sun gear and means for holding said carrier against rotation, a ring gear meshing with said planet gears and drivingly connected to a second sun gear, means for holding said drivingly connected ring gear and second sun gear against rotation, means for coupling said drivingly connected ring gear and second sun gear to the output shaft, a second rotatable carrier supporting planet gears meshing with said second sun gear and means for coupling said second carrier to the output shaft, a ring gear drivingly connected to the input shaft and meshing with the planet gears of the said second carrier.

17. In a power transmission, a housing, input and output shafts, step gearing comprising first and second axially aligned planetary gear sets each set comprising a sun gear, a ring gear and a rotatable carrier on which is mounted at least one planet gear, a driving connection between the input shaft and the sun gear of the first gear set and the ring gear of the second gear set, a one way brake between the carrier of the first gear set and the transmission housing limiting the rotation of the carrier to the direction of rotation of the input shaft, selective means for holding the sun gear of the second gear set against rotation as a reaction member, a pair of clutches for selectively coupling a member of each gear set to the output shaft, and a driving connection between the ring gear of the first gear set and the sun gear of the second set.

18. In a power transmission having input and output members, two planetary gear sets each comprising sun, ring and planet gear carrier elements, means for coupling the input member to first elements of each gear set, releasable means for coupling the output member to second elements of each gear set, said second elements being drivingly coupled to each other, releasable brake means for holding a third element of one gear set as a reaction member and means for coupling the output member to a third element of the other gear set.

19. In a power transmission having input and output members, two planetary gear sets, each set comprising sun, ring and planet gear carrier elements, means for coupling the input member to first elements of each gear set, releasable means for coupling the output member to second elements of each gear set, releasable brake means for holding a third element of one gear set, and means for coupling the output member to the carrier element of the other set to obtain a gear reduction between the input and output members when said brake means is applied and said releasable coupling means is released, said second elements being drivingly connected to each other.

20. In a power transmission having input and output members, two planetary gear sets, each comprising sun, ring and planet gear carrier elements, means for coupling the input member to first elements of each gear set, releasable means for coupling the output member to second elements of each gear set, brake means for holding the carrier element of one gear set and means for coupling the output member to the carrier of the other gear set, said second elements being drivingly connected to each other.

21. In a power transmission having input and output members, two planetary gear sets comprising sun, ring and planet gear carrier elements, means for coupling the input member to an element of each gear set, releasable means for coupling the output member to the ring gear of one gear set and the sun gear of the other set, releasable brake means for holding the carrier element of said one gear set as a reaction member, and means for coupling the output member to the carrier element of said other gear set.

22. In a power transmission, input and output members, first and second planetary gear sets comprising sun, ring and planet gear carrier elements, means for coupling the input member to the first gear set sun element and second set ring element, a driving connection between second elements of each gear set, releasable means for coupling the output member to said second elements, releasable brake means for holding a third element of the first gear set and means for coupling the output member and a third element of the second gear set.

23. In a power transmission, input and output members, first and second planetary gear sets, each set comprising sun, ring and planet gear carrier elements, means for coupling the input member to an element of each gear set, a clutch for coupling the output member to second elements of each gear set, a clutch for coupling the output member to a third element of the second gear set, and selectively engageable brake means for holding an element of each gear set as a reaction element.

24. A variable speed transmission comprising a housing, input and output members, a pair of planetary gear sets each having concentrically rotatable interengaging sun, ring and planet carrier elements, means for effecting three progressive forward and one reverse drive ratios between said input and output members, said means including selectively engageable clutch and brake connections adapted upon successive operation to provide a first forward reduction ratio wherein an element of each gear set is driven at input speed, a sun element of one gear set is connected to rotate with the ring element of the other set, the carrier element of one set is held as a reaction member and the carrier element of the other set rotates at output speed; a second forward reduction ratio wherein said held carrier element is released and said connected sun and ring elements are held stationary; a forward direct drive wherein both planetary gear sets are locked up to rotate as a unit; and a reverse reduction ratio wherein one of the planetary sets is ineffective to modify the drive ratio while in the other set the carrier element is held stationary, the sun element is driven at input speed and the ring element at output speed; said selectively engageable clutch connections including one between the output member and the carrier rotating therewith in all forward reduction ratios.

25. The combination set forth in claim 24 including a clutch connection between the output member and said connected sun and ring elements.

26. The combination set forth in claim 24 and a one-way brake biased to prevent backward rotation of said carrier element held as a reaction member in said first forward reduction ratio.

27. A variable speed transmission comprising input and output members, a pair of planetary gear sets each having sun, ring and carrier elements and a plurality of planet gears meshing with said sun and ring elements, characterized by the sun element of the first planetary set and the ring element of the second set being drivingly connected to the input member, the carrier element of the second set being drivingly connected to the output member, a driving connection between the ring element of the first element set and the sun element of the second set and a clutch for coupling the two last mentioned elements to the output member.

References Cited in the file of this patent

UNITED STATES PATENTS

| | | |
|---|---|---|
| 2,562,464 | Jandasek | July 31, 1951 |
| 2,786,369 | Simpson | Mar. 26, 1957 |
| 2,803,974 | Kelley | Aug. 27, 1957 |